United States Patent Office 2,935,048
Patented May 3, 1960

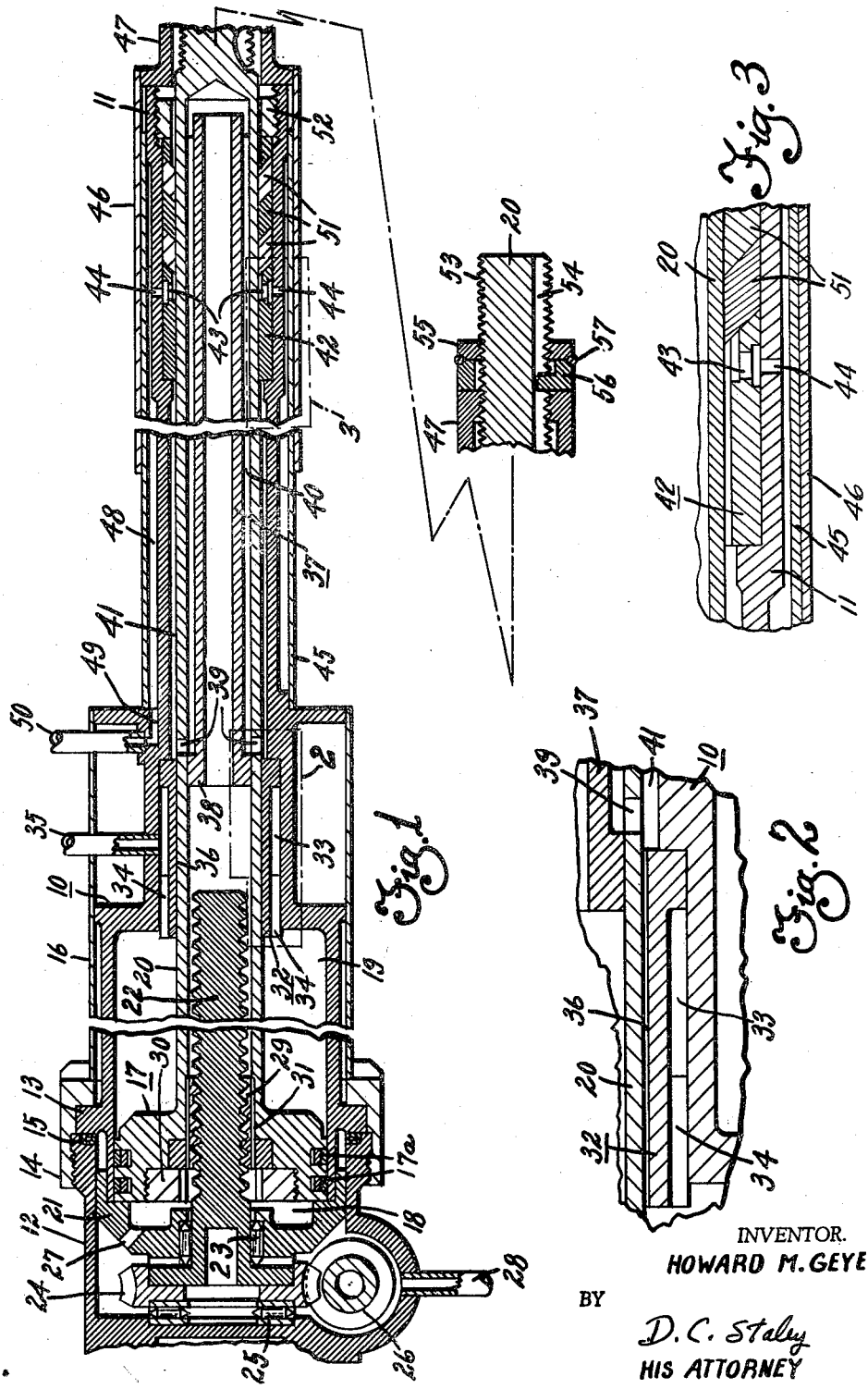

2,935,048

ACTUATOR ASSEMBLY

Howard M. Geyer, Dayton, Ohio, assignor to General Motors Corporation, Detroit, Mich., a corporation of Delaware Application August 29, 1957, Serial No. 681,033

5 Claims. (Cl. 121—38)

This invention pertains to actuators, and particularly to synchronous hydraulic actuators designed for use in high ambient temperatures.

It is well recognized that hydraulic actuators which are subjected to high ambient temperatures in the range of 1000° F. must include means for circulating hydraulic fluid through the parts exposed to such ambient temperatures to effect cooling thereof. The present invention relates to an actuator assembly designed for synchronous operation with other like actuators including self-cleaning orifice means of the type disclosed in my copending application Serial No. 648,361 filed March 25, 1957, for controlling the metered flow of circulating cooling oil. Accordingly, among my objects are the provision of means for circulating fluid in an actuator designed for synchronous operation with other like actuators; the further provision of an actuator assembly having a cylinder with a rotatable member therein and a piston operatively connected with the rotatable member including means for circulating cooling fluid throughout substantially the entire length of the hollow piston rod thereof; and the still further provision of a synchronous actuator assembly including self-cleaning orifice means for controlling the circulation of cooling fluid.

The aforementioned and other objects are accomplished in the present invention by incorporating an oil circulation tube in a synchronized actuator assembly and a pair of pressure drop bushings for controlling the circulation of cooling oil through the tube. Specifically, the actuator assembly is of the general type disclosed in my Patent No. 2,657,539 and, thus, includes a cylinder having a reciprocable piston therein capable of fluid pressure actuation in both directions. A rotatable member, or screw shaft, is journalled in the cylinder and operatively connected to the piston such that piston movement is dependent upon and effects rotation of the screw shaft. The cylinder is adapted for connection to a fixed support, and the piston includes a hollow rod portion having a closed outer end that extends without the cylinder and is adapted for connection to a movable load device such that the piston is restrained against rotation relative to the cylinder.

The piston divides the cylinder into a retract chamber and an extend chamber, and the rotatable screw shaft has a worm gear connected thereto which engages a worm attached to a flexible power transmitting shaft for interconnecting adjacent like actuators to assure synchronous movement thereof. A portion of the screw shaft is disposed within the hollow piston rod, and in addition, an oil circulation tube is press-fitted into the outer portion of the hollow piston rod, the tube terminating short of the end of the hollow piston rod.

A first pressure drop bushing is interposed between the rod end of the cylinder and the outer periphery of the piston rod. The inner diameter of the pressure drop bushing is radially spaced a slight distance from the periphery of the piston rod, this slight annular clearance constituting an orifice which is cleaned during reciprocation of the piston rod relative to the pressure drop bushing. The rod end of the cylinder also includes an integral axially extending skirt portion which is radially spaced from the piston rod to form an annular channel for the circulation of cooling fluid. The oil circulating tube within the piston rod also includes a portion radially spaced therefrom to form a second annular channel for the circulation of cooling fluid. The annular channel between the piston rod and the cylinder skirt is connected with the annular channel between the piston rod and the circulating tube by a plurality of radial passages. In addition, the actuator includes a second pressure drop bushing disposed between the cylinder skirt and the piston rod. The integral cylinder skirt is enclosed by a tubular heat shield assembly which is likewise radially spaced from the outer periphery of the cylinder skirt so as to form a third annular channel for the circulation of cooling fluid. The third annular channel is connected by a plurality of radial passages to the low pressure side of the second pressure drop bushing. Suitable low pressure metallic seals are interposed between the second pressure drop bushing and the outer end of the cylinder skirt.

The operative connection between the piston and the screw shaft is constituted by a nut carried by the piston, the nut having a plurality of circumferentially spaced passages therethrough which interconnect the hollow rod portion and the extend actuator chamber. In addition, the annular channel between the cylinder skirt and the heat shield assembly is connected to a drain conduit, while the extend and retract chambers of the actuator cylinder are connected through suitable ports to retract and extend conduits.

When the extend chamber of the actuator is subjected to hydraulic fluid under pressure, either to maintain the actuator piston in a fixed position when it is subjected to a compression load, or to effect extend movement of the piston, with the retract chamber connected to drain, a metered amount of the fluid from the extend chamber passes through the passages in the nut, through the hollow piston rod and the oil circulation tube therein, to the annular channel between the circulating oil tube and the inner periphery of the piston rod. This flow of fluid cools substantially the entire length of the hollow piston rod, and part of this fluid flows through the annular space between the first pressure drop bushing and the piston rod to the retract chamber which is connected to drain. Another portion of the cooling fluid passes to the annular channel between the piston rod and the cylinder skirt, and through the annular clearance between the second pressure drop bushing and the piston rod to the annular channel from which it can flow into the drain conduit. The amount of circulating fluid is controlled by the pressure drop bushings which constitute orifices.

When the retract chamber is subjected to pressure, to prevent movement of the piston under a tension load, or to effect movement of the piston in the retract direction, with the extend chamber connected to drain, a metered amount of fluid from the retract chamber passes between the first pressure drop bushing and the piston rod to the annular channel between the piston rod and the cylinder skirt. Part of this fluid passes into the annular channel between the piston rod and the circulating tube carried thereby, and flows to the outer end of the piston rod thereby cooling substantially the entire length thereof, and thence through the circulation tube, the hollow piston rod, the passages in the nut, to the extend chamber. The other portion of the cooling fluid flows through the clearance between the second pressure drop bushing and the piston rod and thence to the annular channel between the cylinder skirt and the heat shield to the drain conduit. In this manner, substantially the entire length of the inner wall, and at least a portion of the outer wall of the hollow piston rod are cooled by the circulating fluid.

Further objects and advantages of the present invention will be apparent from the following description, reference being had to the accompanying drawing, wherein a preferred embodiment of the present invention is clearly shown.

In the drawing:

Figure 1 is a fragmentary view, partly in section and partly in elevation depicting an actuator assembly constructed according to this invention.

Figure 2 is an enlarged view taken within the rectangle 2 of Figure 1.

Figure 3 is an enlarged view taken within the rectangle 3 of Figure 1.

With particular reference to Figure 1, an actuator assembly is shown including a cylinder 10 having an integral axially extending annular skirt portion 11 at the rod end thereof. The head end of the cylinder is closed by a cap 12, the end of which abuts a shoulder 13 on the cylinder 10 and is retained in position by a threaded collar 14, a suitable metallic seal 15 being disposed between the end of the cap 12 and the shoulder 13. A portion of the cylinder 10 is enclosed by a heat shield 16 which is suitably attached thereto, such as by press-fitting. A piston 17 is disposed within the cylinder 10 for reciprocable movement, the piston 17 dividing the cylinder into an extend chamber 18 and a retract chamber 19. The piston 17 includes a head portion having metal sealing rings 17a engaging the inner walls of the cylinder, and also includes an integral hollow piston rod 20 which extends without the cylinder 10.

As alluded to hereinbefore, the actuator assembly of this invention is designed for synchronous operation with other like actuators. Accordingly, a bulkhead 21 is press-fitted onto the head end cap 12, and a rotatable screw shaft 22 is rotatably supported in the bulkhead 21 by needle bearings 23. The inner end of the screw shaft 22 is attached to a worm gear 24 supported by combined radial and thrust bearing means 25, the worm gear 24 meshing with a worm 26. The worm 26 may be attached to a flexible power transmitting shaft, not shown, as in my aforementioned patent, for interconnecting the actuator with like adjacent actuators to assure synchronous movement thereof. The extend chamber 18 is connected by a passage 27 to the end cap 12, which connects with an extend conduit 28.

The piston 17 carries a nut 29 having a reversible threaded connection with the screw shaft 22. The nut 29 is restrained against rotation relative to the piston 17 by a lock nut 30, the nut 29 has a plurality of circumferentially spaced passages 31 therethrough, the purpose of which will be described hereinafter. The hollow piston rod 20 extends through a first pressure drop bushing 32 which is press-fitted in the rod end of the cylinder 10. The pressure drop bushing is formed with an intermediate annular groove 33 which is connected by a plurality of circumferentially spaced axial passages 34 with the retract chamber 19. The annular groove 33 is also connected with a retract conduit 35.

As seen particularly in Figure 2, the inner diameter of the pressure drop bushing 32 is radially spaced a slight distance from the periphery of the piston rod 20, this space being indicated by numeral 36. The space 36 between the pressure drop bushing and the piston rod 20 constitutes a self-cleaning orifice for controlling the metered flow of cooling fluid as will be pointed out hereinafter. Thus, whenever there is a pressure differential across the ends of the pressure drop bushing, a metered amount of fluid can flow through the space 36, and by reason of the piston rod 20 being movable axially relative to the pressure drop bushing, and foreign matter which lodges in the space 36 will be removed during actuator movement.

As seen in Figure 1, the outer portion of the hollow piston rod 20 has an oil circulating tube 37 disposed therein, the tube 37 having a flange portion 38 which is press-fitted in the hollow piston rod inwardly of a plurality of circumferentially spaced radial passages 39 through the piston rod 20. The remaining portion of the tube 37 is radially spaced from the inner wall of the piston rod to form an annular channel 40 for the flow of cooling fluid. In addition, the cylinder skirt 11 is radially spaced from the piston rod 20 to form a second annular channel 41 for the flow of cooling fluid, channels 40 and 41 being interconnected by the passages 39 in the piston rod 20.

A second pressure drop bushing 42 is disposed between the cylinder skirt 11 and the piston rod 20, the pressure drop bushing 42 likewise having a slight annular clearance space between its inner diameter and the piston rod 20. The pressure drop bushing 42 has a plurality of radial passages 43 therein aligned with radial passages 44 in the skirt 11. The skirt 11 is enclosed by a heat shield assembly comprising a sheet metal tube 45 and a telescoping sheet metal tube 46. The sheet metal tube 45 is press-fitted at both ends on shoulders of the skirt 11, and the sheet metal tube 46 is press-fitted on a flange of a stroke adjusting nut 47. The tube 45 is radially spaced from the skirt 11 to form a third annular channel 48 which is connected with the low pressure side of the pressure drop bushing 42 through the passages 44 and 43. The annular channel 48 is also connected by a passage 49 with a drain conduit 50 for the circulating cooling fluid.

A plurality of low pressure metallic seals 51 are disposed between the low pressure side of the pressure drop bushing 42 and a nut 52 threadedly engaging the skirt 11. The outer end of the piston rod 20 is threaded as indicated by numeral 53 and also has an axial keyway 54. The stroke adjusting nut 47 threadedly engages the rod 20 and is retained in position by a lock nut 55, a key member 56 being interposed between the lock nut 55 and the stroke adjusting nut 47. These parts are maintained in locked relation by a lock wire 57. By adjusting the axial position of the nut 47, the stroke of the actuator can be varied, since the nut 47 is engageable with the end of the skirt 11 and thus can determine the retract position of the actuator. By threading the nut outwardly on the rod 20 the maximum extend position can be varied, since in this instance the retract position will be determined by engagement of the piston 17 with the bulkhead 21 as shown in Figure 1.

In an actuator installation, the head cap 12 is attached by suitable means to a fixed support and the rod 20 is attached to a movable load device such that rotation of the piston 17 is restrained. When the extended chamber 18 is subjected to hydraulic fluid under pressure from conduit 28, and the conduit 35 is connected to drain, the piston 17 will move to the right as viewed in Figure 1. Movement of the piston will effect rotation of the screw shaft 22, the worm gear 24 and the worm 26 so that likewise adjacent actuators have their movements synchronized. Whenever the extend actuator chamber 18 is subjected to pressure while the retractor chamber 19 is connected to drain, a metered amount of fluid will circulate to cool the piston rod which is subjected to high ambient temperatures. Thus, a metered amount of fluid will flow from the extend chamber 18 through the passages 31 in the nut 29 into the hollow piston rod 20, through the circulating tube 37 to the closed outer end of the piston rod 20. This fluid will flow back through the annular channel 40 so as to cool the inner wall of the piston rod 20 and through the ports 39 to the annular channel 41. A portion of the fluid under pressure in channel 41 will flow through the clearance between the pressure drop bushing 32 and the piston rod 20 to the retract chamber which is connected to drain. The other part of the circulating fluid will flow through channel 41, through the clearance between the pressure drop bushing 42 and the rod 20 and thence through ports 43 and 44 to the annular channel 48. This portion of the cooling fluid will cool at least a part of the outer wall of the piston rod 20. The fluid in channel 48 can flow through passage 49 to the drain conduit 50.

Similarly, when the retract chamber 19 is subjected through conduit 35 to pressure, and the extend chamber 18 is connected to drain through conduit 28, a metered amount of fluid, as controlled by the pressure drop bushing 32 will flow from the retract chamber 19 through the passage 36 to the channel 41. Part of the fluid from channel 41 will flow through passages 39 to the channel 40 and thus cool the inner wall of the piston rod 20, this fluid passing to drain through tube 37, the piston rod 20, the passages 31 in the nut 29 and to the retract chamber 18. The other portion of the cooling fluid will flow through channel 41, the annular space between pressure drop bushing 42 and the piston rod so as to cool part of the outer wall of the piston rod 20, and thus to drain through passages 43 and 44, channel 48, passage 49, and conduit 50.

From the foregoing it is apparent that the present invention provides an actuator assembly adapted for synchronous operation with other like actuator assemblies including means for cooling substantially the entire length of a hollow piston rod which is subjected to high ambient temperatures. In addition, the assembly of the present invention incorporates self-cleaning orifice means which control the metered circulation of cooling fluid between the actuator chambers to cool substantially the entire length of the inner wall of the hollow piston rod and at least a portion of the outer wall of the hollow piston rod so as to maintain the exposed parts of the actuator within safe operating temperature limits.

While the embodiment of the invention as herein disclosed constitutes a preferred form, it is to be understood that other forms might be adopted, as may come within the scope of the claims which follow.

What is claimed is as follows:

1. A high temperature fluid pressure operated actuator including, a cylinder, a reciprocable piston disposed in the cylinder and dividing said cylinder into an extend chamber and a retract chamber, said piston having a hollow rod with a closed outer end extending from said cylinder, said cylinder having an integral skirt enclosing a portion of said rod outside of said cylinder and spaced radially therefrom to form a first annular channel therebetween, a heat shield assembly enclosing said skirt and spaced radially therefrom to form a second annular channel between said skirt and said heat shield assembly, first orifice means between said retract chamber and said first annular channel, second orifice means between said first annular channel and said third annular channel, means connecting said second annular channel to drain, means connecting said first annular channel with the interior of said hollow rod adjacent the outer end thereof, and passage means connecting the interior of said hollow rod with the extend chamber, said first orifice means permitting a metered flow of fluid between the extend and retract chambers due to a pressure differential therebetween for cooling substantially the entire length of said hollow rod, said second orifice means permitting a metered flow of cooling fluid from said first annular channel to drain through said second annular channel to cool at least a portion of the outer periphery of said rod and a portion of said skirt.

2. The actuator assembly set forth in claim 1 wherein said orifice means comprise pressure drop bushings, the inner surfaces of said pressure drop bushings being radially spaced from said rod so as to constitute self-cleaning orifices.

3. The actuator set forth in claim 1 wherein the means connecting the second annular channel to drain includes at least one passage in said skirt and a drain conduit communicating with said passage.

4. The actuator set forth in claim 1 wherein the means connecting the first annular channel with the hollow piston rod adjacent the outer end thereof includes at least one passage in said hollow piston rod and a tube disposed within said piston rod having an end terminating short of the closed outer end thereof, a portion of said tube being radially spaced from the inner wall of said rod so as to form a third annular channel connecting said passage with the outer end of said piston rod.

5. A high temperature fluid pressure operated actuator including, a cylinder, a reciprocable piston disposed in the cylinder and dividing said cylinder into opposing chambers, said piston having a hollow rod with a closed outer end extending from said cylinder, said cylinder having a skirt enclosing a portion of said rod outside of said cylinder and spaced radially therefrom to form an annular channel therebetween first orifice means between one of said chambers and said annular channel, second orifice means connecting said first annular channel to drain, means connecting the annular channel with the interior of said hollow rod adjacent the outer end thereof, and passage means connecting the interior of said hollow rod with said other chamber whereby said first orifice means permits a metered flow of fluid between said opposed chambers due to a pressure differential therebetween to cool substantially the entire length of said hollow rod and said second orifice means permits a metered flow of fluid from said annular channel to cool at least a portion of the outer periphery of said rod.

References Cited in the file of this patent

UNITED STATES PATENTS

| | | |
|---|---|---|
| 1,024,379 | Tosco et al. | Apr. 23, 1912 |
| 2,217,239 | Smith | Oct. 8, 1940 |
| 2,688,313 | Bauer | Sept. 7, 1954 |
| 2,688,951 | Sears | Sept. 14, 1954 |
| 2,806,450 | Geyer | Sept. 17, 1957 |